Feb. 26, 1963    R. A. CAUGHEY    3,078,506
APPARATUS FOR MOLDING WOOD PARTICLES
Filed June 30, 1960
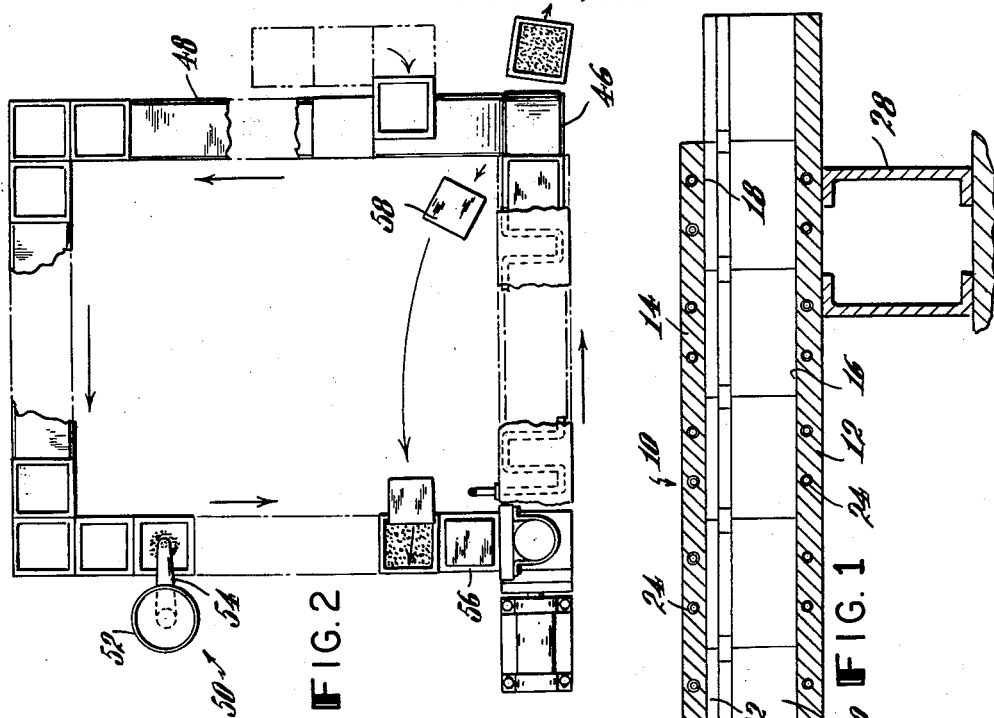
INVENTOR.
Robert A. Caughey
BY Roberts, Cushman & Grover
ATT'YS.

United States Patent Office 3,078,506
Patented Feb. 26, 1963

3,078,506
APPARATUS FOR MOLDING WOOD PARTICLES
Robert A. Caughey, Antrim, N.H., assignor to Antrim Molding Company, Inc., Antrim, N.H., a corporation of New Hampshire
Filed June 30, 1960, Ser. No. 39,984
2 Claims. (Cl. 18—4)

This invention relates to molding apparatus and especially to molding of wood particles coated with a binder which is adapted to be activated by the application of pressure and heat to bind the particles together.

The compression phase of total molding cycle is usually a relatively short portion of the total productive cycle while the curing portion may require a relatively high proportion of the productive cycle. It is the principal object of this invention to provide apparatus in which the productive cycle is not limited by the time required for curing, thereby to increase the productive capacity of the apparatus; and to provide an apparatus in which standard mold parts may be employed to mold different kinds of parts at the same time, thereby to achieve substantially the same economies in operating cost for the manufacture of a few items as is realized in the manufacture of a large number of items of the same kind.

As herein illustrated, the apparatus comprises an elongate open-ended curing chamber having spaced parallel bearing surfaces for slidably receiving two-part mold parts consisting of a bottom receptacle and a cover for movement therealong, from one end to the other, while holding the parts under pressure at a fixed position relative to each other, a fixed platen at one end of the chamber having a supporting surface in the plane of one of the bearing surfaces of the chamber for supporting the bottom or the mold part at the entrance to the chamber, a movable platen having a pressure-applying surface disposed opposite the fixed platen, means for moving the movable platen toward the fixed platen to press the cover of the mold into the bottom part and into the plane of the other bearing surface of the chamber, a ram disposed in spaced relation to the entrance to the chamber in a position to engage the mold between the fixed and movable platens, and means for effecting movement of the ram in a direction to force the compressed mold parts into the chamber between the bearing surfaces. For attaining continuous production there is a conveyor at the exit end of the curing chamber for returning empty molds to the entrance chamber and there is a loader situated along the conveyor for depositing a charge of moldable material into the bottom part of each mold as it is moved toward the entrance to the chamber. The mold fixtures which consist of a bottom receptacle and top are adapted to be pressed into engagement when a charge is disposed therein to a vertical dimension corresponding to the heightwise dimension of the curing chamber but may have varying lateral dimensions and varying internal dimensions for producing parts of different shape and size without modification of the apparatus.

The invention will now be described in greater detail with reference to the accompanying drawings wherein:

FIG. 1 is an elevation of the apparatus taken longitudinally of the curing chamber and showing the latter in section;

FIG. 2 is a plan view broken away in part and showing conveyors for returning empty molds from the discharge end of the curing chamber to the entrance end; and FIGS. 3 and 4 show mold fixtures of the same external heightwise dimension but of different internal dimensions.

Referring to the drawings, there is shown an elongate curing chamber 10 having spaced parallel, rigid, lower and upper walls 12 and 14 which provide spaced, parallel bearing surfaces 16 and 18 for slidably receiving a plurality of mold assemblies, end to end, each comprised of a bottom part or receptacle 20 and a cover 22 for holding the parts engaged during movement along the chamber. Side walls of suitable kind are provided for holding the top and bottom walls at the desired spacing. Each of the walls 12 and 14 contain a circuitous passage in which there is disposed a pipe 24 through which a heating medium may be passed to heat the chamber for curing the material compacted in the molds. Electric resistance elements could, of course, be substituted for the pipes 24 if desired.

The chamber 10 is supported in a horizontal position on legs 28—28 and, at its left-hand end, the bottom wall 12 has an integral extension, which forms a rigid supporting platen 30 at the entrance to the chamber for receiving and supporting a mold preparatory to movement of the mold into the chamber. A movable platen 32 is mounted above the platen 30 on the lower end of a ram 34 protruding from the lower end of a cylinder 36, the latter being mounted in a vertical position on a support 38 fastened to the frame of the apparatus. By supplying fluid pressure to the cylinder 36 the movable platen 32 may be moved downwardly to bring its lower surface into the plane of the inner surface 18 of the curing chamber and hence to press the cover of a mold assembly resting on the fixed platen into the bottom part sufficiently, so that the top surface of the covre is flush with the undersurface 18.

A pusher plate 40 is mounted on the fixed platen 30 opposite the entrance to the chamber, but outwardly of the movable platen 32, and is fixed to a ram 42 projecting from a cylinder 44. The pusher plate 40 has a heightwise dimension corresponding to the vertical spacing of the walls 12 and 14, so that when pressure is supplied to the cylinder 44 the pusher plate 40 can be moved between the fixed and movable platens 30 and 32 to force a mold assembly situated therebetween without release of pressure during the transfer into the chamber. It is thus apparent that a mold assembly with a moldable charge disposed therein may be compressed at the entrance to the curing chamber and then forced into the curing chamber in a relatively short period of time, and that since the chamber will receive a plurality of such molds, at any one time, successive mold assemblies may be as quickly pressed and forced into the chamber, so that high productive capacity may be achieved. By providing a chamber of suitable length and choosing the right curing temperature the capacity of the apparatus is only limited by the rate at which successive mold assemblies can be pressed. At the discharge end of the chamber the binder is set sufficiently so that there is no outward pressure on the mold parts.

For the purpose of expediting handling the mold assemblies after curing, there is a discharge platform, herein shown as constituted by a platform 46 for receiving the mold assemblies as they are pushed from the discharge end of the chamber. At this point, the covers are removed and the molded parts extracted, whereupon, the bottom part of the mold may be returned to the entrance end of the chamber by conveyors 48. At a convenient position along the conveyor, preferably near the entrance end to the chamber, there is a loading station 50 comprised of a receptacle 52 for holding a large quantity of moldable material with a bottom nozzle 54, by means of which the moldable material may be discharged into the bottom part of the mold. As the bottom of the mold moves from the place of charging toward the fixed platen 30 for compaction, a cover which is returned by suitable means is applied to the top of the mold and then the mold is moved forwardly beneath the movable platen 32.

Each mold, as shown in FIGS. 3 and 4, has a bottom part 56 and a cover 58. The heightwise dimensions of the mold assembly must be such that the parts can be compressed with a charge disposed therein to an overall height corresponding to the distance between the top and bottom walls. The lateral dimensions of the mold assembly, however, are limited only by the width of the chamber which may be made broad enough to accommodate molds of several different widths. Thus the lateral dimensions of the molded article may be different without requiring modification of the apparatus for handling it, nor disturbing the continuity of the operation. Furthermore, the internal structure of the molds may be varied to make different kinds of articles without changing the external heightwise dimension so that it is possible to make a few articles of one kind about as cheaply as large quantities of another kind since the only requirement is to provide a suitable mold.

When making a wood particle molding ¾ of an inch thick and at a density of 50 pounds per cubic foot, the time required to compact the charge to final thickness is about 5 seconds, however the curing time may take as long as 8 minutes. The ideal length of the curing chamber therefore should be such that it will hold a number of molds equal to the ratio between the curing time and the total time required to compress a mold assembly and transfer it to the curing chamber. Thus if the curing time is 8 minutes and the total mold handling time is 30 seconds, the chamber should be designed to hold 16 molds.

The material herein used for making molding is comminuted wood in the form of chips, particles or dust coated with a thermosetting plastic.

It should be understood that the present disclosure is for the purpose of illustration only and that this invention includes all modifications and equivalents which fall within the scope of the appended claims.

I claim:

1. Molding apparatus comprising an elongate chamber having rigid, vertically spaced, parallel top and bottom walls, an apron at one end of the bottom wall which extends beyond the top wall, said apron providing a loading platform at that end from which unconnected loaded mold assemblies are introduced one at a time, under pressure, into the chamber between the top and bottom walls, interengageable two-part molds adapted to receive a charge of moldable material which, in its uncompressed condition, holds the parts separated by an amount such that the vertical depth of the interengageable mold parts exceed the vertical distance between the top and bottom walls, a ram supported above and perpendicular to the apron operable to force the mold parts together to compact the material contained therein, said ram having a lower position such that its acting face coincides with the plane of the inner surface of the top wall, so that the upper surface of the upper mold part coincides with said inner surface, a second ram mounted on the apron parallel thereto and spaced from the entrance to the chamber by at least the length of the mold resting on the apron to permit movement of the mold onto the apron between it and the entrance to the chamber, said second ram being operable to force the mold, while its parts are held engaged by the first ram, at a height corresponding to the depth of the chamber into the chamber and to move a preceding mold along the chamber by an amount corresponding to the length of the mold pushed thereby into the chamber, said top and bottom walls of the chamber holding the mold parts engaged throughout movement therethrough, and the top and bottom walls of the chamber having intimate surface contact with the top and bottom of the mold parts, heating elements contained by the walls for heating the same and, by conductance of the latter, heating the mold assemblies so as to cure the moldable composition contained thereby, and a second apron constituted by an extension of the bottom wall at the opposite end of the chamber for receiving molds discharged at that end of the chamber.

2. Molding apparatus according to claim 1, comprising means for transmitting empty molds from the discharge apron to the loading apron and filling means situated along said transfer means for charging the mold with a moldable composition.

References Cited in the file of this patent
UNITED STATES PATENTS

| | | |
|---|---|---|
| 1,674,387 | Campbell | June 19, 1928 |
| 1,706,874 | DeJourno | Mar. 26, 1929 |
| 1,958,422 | Dinzl | May 15, 1934 |
| 2,733,479 | English | Feb. 7, 1956 |
| 2,943,353 | Fraula | July 5, 1960 |

FOREIGN PATENTS

| | | |
|---|---|---|
| 557,465 | Canada | May 13, 1958 |
| 691,094 | France | Oct. 1, 1930 |